United States Patent [19]
Del Signore, II

[11] 4,128,760
[45] Dec. 5, 1978

[54] AMBIENT LIGHT COMPENSATING CIRCUIT

[75] Inventor: James R. Del Signore, II, Ithaca, N.Y.

[73] Assignee: NCR Corporation, Dayton, Ohio

[21] Appl. No.: 785,720

[22] Filed: Apr. 7, 1977

[51] Int. Cl.$^2$ ............................................... H01J 39/12
[52] U.S. Cl. ............................ 250/214 B; 356/222
[58] Field of Search ........ 250/214 AL, 214 B, 214 C; 356/222, 229

[56] References Cited

U.S. PATENT DOCUMENTS

| | | | |
|---|---|---|---|
| 2,278,920 | 4/1942 | Evans et al. | 250/214 C |
| 3,528,350 | 9/1970 | Schmitt | 356/222 X |

*Primary Examiner*—Lawrence J. Dahl
*Attorney, Agent, or Firm*—J. T. Cavender; Wilbert Hawk, Jr.; George J. Muckenthaler

[57] ABSTRACT

An automatic ambient light compensating circuit for use in conjunction with a light sensing device to render the light sensing device insensitive to variations in ambient light conditions and which is particularly adapted for use with reflective sensor systems. An optical sensor, including a source of light and a first photodetector, is disposed to detect the presence of an object in proximity thereto. The optical sensor provides an output signal which is a function of the amount of light received by the first photodetector and includes light from the source of light and ambient light. The output signal of the optical sensor is provided as an input to a signal level detection means. A second photodetector responsive only to ambient light is operatively connected in parallel with the output of the optical sensor to the level detection means to compensate the output signal of the optical sensor for ambient light conditions.

12 Claims, 3 Drawing Figures

FIG. 1
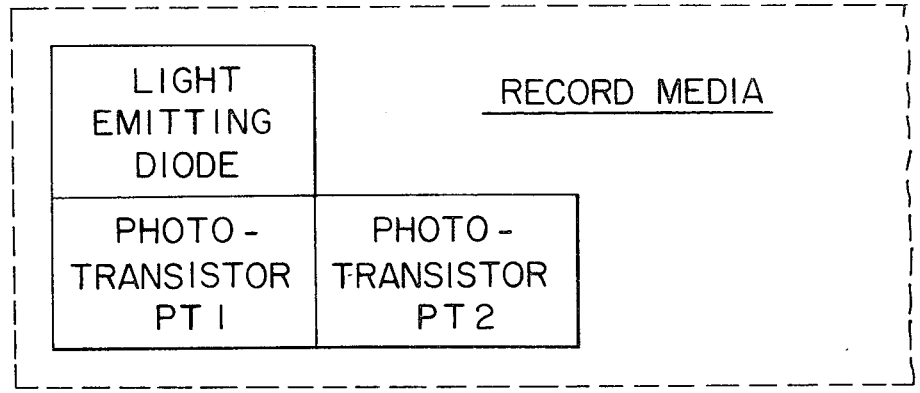
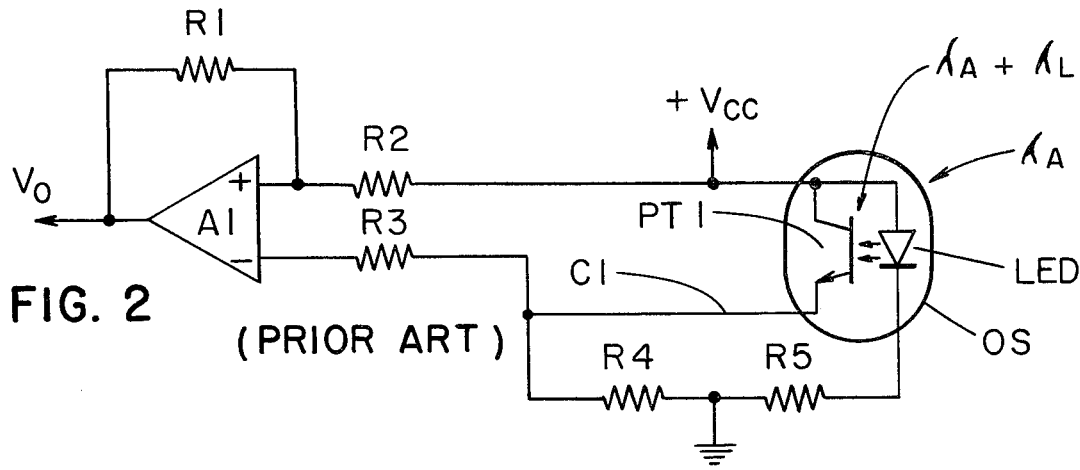
FIG. 2 (PRIOR ART)
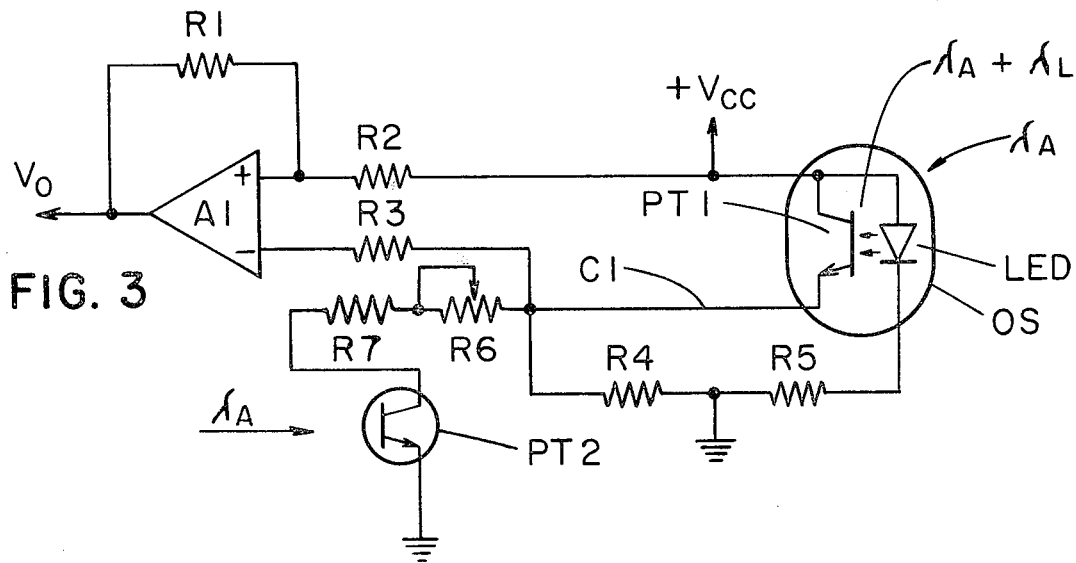
FIG. 3

AMBIENT LIGHT COMPENSATING CIRCUIT

BACKGROUND OF THE INVENTION

I. Field of the Invention

The present invention relates generally to light sensitive control means and more particularly to photodetection means adapted to detect the presence of an object in proximity thereto. Specifically, the invention is concerned with an ambient light compensating circuit which allows the photodetection means to effectively operate in variable ambient light conditions.

II. Description of the Prior Art

Photoelectric control circuits having means for compensating for variations in lighting conditions are well known in the art and include those shown in U.S. Pat. No. 3,089,065 to L. E. Worden U.S. Pat. No. 3,328,590 to C. B. Kapsambelis, U.S. Pat. No. 3,811,046 to H. Levick, U.S. Pat. No. 3,586,445 to J. H. Martin, Jr., and U.S. Pat. No. 3,867,628 to R. M. Brown.

Typical ambient light compensating circuitry, as disclosed in Kapsambelis, conventionally requires relatively complex circuitry, as evidenced by functional blocks 24, 12, 14, and 16 shown in FIG. 1 of Kapsambelis. The necessity for this complex circuitry, with its attendant cost and unreliability, has made the use of such ambient light compensating circuitry impractical in many instances.

Other prior art ambient light compensating circuitry, as typically disclosed by Levick, uses a capacitor voltage level to compensate for variations in the ambient light. The use of such a capacitor materially reduces the response time of the ambient light compensating circuit to variations in ambient light and therefore limits its application.

There is, therefore, a need for an ambient light compensating means which is relatively simple, reliable, inexpensive, and which has a relatively fast response time to changes in ambient light conditions.

The present invention solves this need by providing a very simple ambient light compensating means utilizing a minimum of components with the accompanying improvements in cost and reliability. Further, the ambient light compensating means provided has a relatively fast response time to variations in ambient light and is readily adaptable to existing light sensing circuits.

SUMMARY OF THE INVENTION

This invention relates to an automatic ambient light compensating circuit and is particularly adapted for use with optical sensors having a first photodetector whose output is responsive to a source of light and ambient light conditions. A second photodetector is operatively connected to the output of said first photodetector and is disposed to be responsive only to ambient light conditions. The second photodetector compensates the output of the first photodetector for ambient light by effectively subtracting from the output of the first photodetector a signal in an amount related to that portion of the output due to ambient light. The resulting signal output is therefore primarily a function of the light received from the source of light.

BRIEF DESCRIPTION OF THE

FIG. 1 is a simplified diagram disclosing the physical relationship of the principle elements of the present invention in a typical application.

FIG. 2 is a schematic circuit diagram of a prior art light sensitive control circuit.

FIG. 3 is a schematic circuit diagram of the present invention.

DETAILED DESCRIPTION OF AN EXEMPLARY EMBODIMENT

Referring now to FIG. 2 of the drawings, there is disclosed a typical prior art light sensitive control circuit which may be utilized to detect the presence of an object in proximity to an optical sensor. A typical application for such a circuit would include a printer or other record member handling unit wherein it is desirable to determine whether or not a record member is physically present at a particular location within the device.

The light sensitive control circuit disclosed in FIG. 2, includes an optical sensor OS which is comprised generally of a light emitting diode LED and a phototransistor PT1 relatively disposed such that light emitted by the light emitting diode LED is reflected by objects in proximity thereto and is received by the phototransistor PT1. The phototransistor PT1 is a variable impedance device which generally has a decreasing impedance for an increasing level of detected light. A typical example of such a light emitting diode and phototransistor combination is a source and sensor assembly designated TIL 139 and manufactured by Texas Instruments Incorporated, Dallas, Texas.

In a typical application the optical sensor OS and in particular the phototransistor PT1 will be exposed to light from the light emitting diode LED and ambient light, as indicated in FIG. 2. The impedance of the phototransistor PT1 is therefore a function of the reflected light received from the light emitting diode LED and ambient light. It can readily be seen, therefore, that the output of the optical sensor OS will be a function of both the reflected light received from the light emitting diode, LED, and ambient light.

The output of the optical sensor OS is partially shunted to ground through resistor R4 with the remainder of the output being provided to the inverting input of an operational amplifier A1 through input resistor R3, such amplifier A1 being of a suitable transresistance type having an output voltage Vo proportional to the difference in input current. Similarly, a signal from supply voltage Vcc is provided to the noninverting input of the operational amplifier through an input resistor R2. A feedback network including resistor R1 connects the output Vo of the operational amplifier A1 to the noninverting input thereof to produce a positive feedback. The operational amplifier A1 is thus configured to act as a differential comparator having an output that toggles between a negative saturation and a positive saturation depending on the relative value of the two inputs provided.

In operation, a signal is applied from the supply Vcc to the light emitting diode LED, causing the light emitting diode to emit light. Such emitted light is reflected from an object in proximity to the optical sensor OS and is detected by the phototransistor PT1. Additionally, ambient light is also detected by PT1 so that the decreased impedance of phototransistor PT1 due to the light impinging thereon is a function of both the reflected light and ambient light. The decrease in impedance of the phototransistor PT1 will cause the output of the optical sensor OS through conductor C1 to increase and cause a corresponding increase in the signal applied to the inverting input of the operational amplifier A1.

During initial conditions, when light is not being reflected by an object in proximity to the optical sensor OS and there is no ambient light, the signal provided to the inverting input of operational amplifier A1 will be at a minumum level and less than the signal provided to the noninverting input of such operational amplifier A1. In this particular state the output Vo of operational amplifier A1 will be at a high level.

When an object is disposed in proximity to the optical sensor OS, light emitted by the light emitting diode LED will be reflected from the object and detected by the phototransistor PT1, which detection will reduce the impedance of phototransistor PT1 and increase the output signal of the optical sensor OS. A corresponding increase in signal will be provided at the inverting input of the operational amplifier A1. When the signal to the inverting input of the operational amplifier A1 becomes greater than the signal applied to the noninverting input of operational amplifier A1, the output Vo of the operational amplifier will toggle from a high level to a low level, thereby producing an electrical indication of the presence of an object in proximity to the optical sensor OS.

When the object in proximity to the optical sensor OS is removed, the phototransistor PT1 will again assume a high impedance state to thereby reduce the signal applied to the inverting input of operational amplifier A1 such that when the inverting input of the operational amplifier A1 decreases below the input applied to the noninverting input thereof, the output Vo of such operational amplifier A1 will again toggle from a low level to a high level.

There is thus provided a means for producing an electrical indication in response to the detection of the presence of an object in proximity to the optical sensor OS such that when an object is in proximity to the optical sensor, the operational amplifier output Vo is caused to be at a low level and when an object is not in proximity to the optical sensor, the output Vo of the operational amplifier A1 is caused to be at a high level.

As discussed above, in typical reflective sensor applications, the phototransistor PT1 is subject not only to light reflected by objects in proximity to the optical sensor, but also to ambient light. It may therefore be appreciated that the change in impedance of the phototransistor PT1 is not only a function of the reflected light from the light emitting diode LED, but is also a function of the ambient light. The output signal Vo is therefore also dependent on ambient light.

Under changing ambient light conditions, the output Vo of the operational amplifier A1 may be induced to change its state solely due to a change in ambient light conditions, thereby causing an erroneous output signal.

Shown in FIG. 3 is the circuit of FIG. 2 having incorporated therein an ambient light compensating means comprised generally of phototransistor PT2 and resistors R6 and R7. The phototransistor PT2 is physically disposed to receive only ambient light so that the change in impedance of the phototransistor PT2 is solely a function of ambient light. The input of the phototransistor PT2 is in electrical communication through resistors R6 and R7 with the output of the optical sensor OS, while the output of such phototransistor PT2 is shunted to a ground potential.

Functionally, the phototransistor PT2 shunts to ground through resistor R6 a portion of the output provided by the optical sensor OS. In the exemplary embodiment the change in impedance of phototransistor PT1 is substantially equal to the change in impedance of phototransistor PT2 so that phototransistor PT2 will have similar response characteristics to the ambient light. The values of the various resistors R1-R5 will of course depend on the input current limitations of the particular operational amplifier A1 employed. Additionally, while resistor R6 is shown to be of the variable type so as to permit compensation for small differences which may exist in the spectral response of the several phototransistors PT1 and PT2, and preferably employs therewith the fixed resistor R7 as a convenient means of limiting maximum current input of the phototransistor PT2, such resistor R6 may also be of the fixed value type having a value likewise compatible with the current requirements of the operational amplifier A1. The current controlling need for resistor R7 is of course eliminated with application of such latter, fixed resistor R6.

It may now be appreciated that as an increase in ambient light reduces the impedance of phototransistor PT1 with a resulting increase in the output signal by the optical sensor OS, there will be a tendency for the signal to the inverting input of the operational amplifier A1 to increase. The same increase in ambient light will similarly decrease the impedance of phototransistor PT2 with a corresponding tendency to decrease the signal at the inverting input of operational amplifier by shunting a portion of the output signal of optical sensor OS to ground. The effects of ambient light on the two phototransistors PT1 and PT2 tend to counteract each other. There is thus provided a means for compensating for variations in ambient light conditions wherein an erroneous response to such ambient light conditions by a first phototransistor within an optical sensor is reduced and/or removed by a second phototransistor exposed only to ambient light.

In an alternative embodiment, it is desired that the light emitting diode LED, the phototransistor PT1 and the phototransistor PT2 be constructed on a common substrate in order to reduce cost and to maintain phototransistor PT1 in close proximity to phototransistor PT2. Shown in FIG. 1 is a schematic representation of such an arrangement viewing the light emitting diode, phototransistor PT1 and phototransistor PT2 from above through a record media as indicated by the dotted lines. Conventional use of lenses may be employed to direct the light emitted from the light emitting diode to the record media with further lens means being used to focus any light reflected therefrom onto phototransistor PT1.

Although the invention has been illustrated and described using general terms, the invention is not to be necessarily limited to the specific construction illustrated and described since such construction is only intended to be illustrative of the principle of operation of the means presently devised to carry out said principle. It is thus to be considered that the invention comprehends any modifications of structure that may be permitted without departing from the spirit and scope of the invention. For example, while the preferred embodiment utilizes radiant energy within the wavelength limits perceptible by the average human eye, i.e. visible light, it will be obvious to those skilled in the art that the invention is also applicable to radiant energy of different wavelengths, such as ultraviolet and infrared light emissions, whether visible or not. The appended claims are therefore intended to cover any such modifications within the limits of the true spirit and scope of the invention.

What is claimed is:

1. An ambient light compensating circuit, comprising:
   (a) a first light sensing means having an output on which is provided a signal responsive in part to a light source and in part to ambient light;
   (b) a second light sensing means responsive only to ambient light and operatively connected in parallel with the output of said first light means, wherein said second light sensing means compensates said signal of said first light sensing means in an amount related to the ambient light; and
   (c) signal level means operatively connected to the output of said first light sensing means for detecting that portion thereof responsive to the light source.

2. The ambient light compensating circuit of claim 1, wherein said first light sensing means includes a source of light and a first photodetection means.

3. The ambient light compensating circuit of claim 2, wherein said first photodetection means is a junction transistor responsive to ambient light and light from said source of light.

4. The ambient light compensating circuit of claim 3, wherein said first photodetection means is a junction transistor responsive to reflected light from said source of light.

5. The ambient light compensating circuit of claim 1, wherein said second light sensing means includes a photodetector means having the output thereof operatively connected to ground potential.

6. The ambient light compensating circuit of claim 5, wherein resistive means is connected with the output of said first light sensing means and with the input of said photodetector means.

7. In a light sensitive control circuit having a first photodetector means providing an output responsive in part to a source of light and in part to ambient light, signal level means connected with said output for detecting that portion thereof responsive to said source of light, the improvement comprising:
   a second photodetection means responsive to ambient light in close proximity to said first photodetection means and operatively connected in parallel with the output of said first photodetection means for compensating the output of said first photodetection means in accordance with ambient light conditions.

8. The control circuit of claim 7, wherein said second photodetection means comprises:
   a phototransistor having the input thereof operatively connected to said first photodetection means and having the output of said phototransistor operatively connected to ground potential.

9. In an apparatus for detecting the presence of a record member, said apparatus utilizing a light source and first sensor means for reflective sensing of said record member, and signal level means connected with said first sensor means, and wherein said first sensor means has an output on which is provided a signal responsive in part to light from said light source and in part to ambient light, said signal level means detecting the light source portion of said signal, the improvement comprising:
   a second sensor means in close proximity and operatively connected in parallel with the output of said first sensor means for compensating said signal provided thereon by removing the effect of said ambient light therefrom.

10. The apparatus of claim 9 wherein said second sensor means comprises:
    a photodetector having an input operatively connected to said first sensor means output and an output operatively connected to ground potential.

11. The apparatus of claim 10 wherein a resistor is connected with the input of said photodetector and with the output of said first sensor means.

12. The apparatus of claim 10 wherein said photodetector is a phototransistor.